(12) United States Patent
Tezuka (10) Patent No.: US 10,338,563 B2
(45) Date of Patent: Jul. 2, 2019

(54) NUMERICAL CONTROL DEVICE (71) Applicant: FANUC CORPORATION, Minamitsuru-gun, Yamanashi (JP)

(72) Inventor: Junichi Tezuka, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 81 days.

(21) Appl. No.: 15/805,595

(22) Filed: Nov. 7, 2017

(65) Prior Publication Data
US 2018/0136628 A1 May 17, 2018

(30) Foreign Application Priority Data

Nov. 11, 2016 (JP) .................................. 2016-220748

(51) Int. Cl.
*G05B 19/402* (2006.01)
*G05B 19/4069* (2006.01)

(52) U.S. Cl.
CPC ....... *G05B 19/402* (2013.01); *G05B 19/4069* (2013.01); *G05B 2219/35346* (2013.01); *G05B 2219/39573* (2013.01)

(58) Field of Classification Search
None
See application file for complete search history.

(56) References Cited

U.S. PATENT DOCUMENTS

| 2011/0057599 | A1* | 3/2011 | Iwashita | G05B 19/4068 318/601 |
|---|---|---|---|---|
| 2011/0246132 | A1* | 10/2011 | Sato | B23Q 5/28 702/150 |
| 2012/0296462 | A1* | 11/2012 | Otsuki | G05B 19/4069 700/104 |

(Continued)

FOREIGN PATENT DOCUMENTS

| JP | 2001-125613 | 5/2001 |
|---|---|---|
| JP | 2007-304714 | 11/2007 |

(Continued)

*Primary Examiner* — Kenneth M Lo
*Assistant Examiner* — Istiaque Ahmed
(74) *Attorney, Agent, or Firm* — Wenderoth, Lind & Ponack, L.L.P.

(57) ABSTRACT

A numerical control device comprises a command position calculation section that calculates command position information based on a machining program; a command path calculation section that calculates command path information based on the command position information; an estimated actual position calculation section that calculates estimated actual position information based on the command position information and transmission characteristic information; an estimated actual path calculation section that calculates estimated actual path information based on the estimated actual position information; a path error calculation section that calculates path error based on the command path information and the estimated actual path information; a machining time calculation section that calculates a machining time based on the estimated actual path informa- (Continued)

tion; a jerk calculation section that calculates jerk based on the estimated actual position information; and an evaluation position calculation section that calculates evaluation values based on the path error, machining time and jerk.

4 Claims, 5 Drawing Sheets

(56) References Cited

U.S. PATENT DOCUMENTS

2013/0054182 A1* 2/2013 Tezuka ............... G05B 19/4069
                                                                                          702/141

FOREIGN PATENT DOCUMENTS

| JP | 2010-267169 | 11/2010 |
| JP | 2011-158982 | 8/2011 |
| JP | 2012-243152 | 12/2012 |
| JP | 2013-097736 | 5/2013 |
| JP | 2016-130908 | 7/2016 |

* cited by examiner

NUMERICAL CONTROL DEVICE

This application is based on and claims the benefit of priority from Japanese Patent Application No. 2016-220748, filed on 11 Nov. 2016, the content of which is incorporated herein by reference.

BACKGROUND OF THE INVENTION

Field of the Invention

The present invention relates to a numerical control device.

Related Art

Conventionally, a simulation device capable of simulating the three-dimensional path of representative points (for example, leading end) of a tool of a machine tool has existed. The simulation device is built into the numerical control device, or is integrally connected thereto, for example.

The simulation device is applied in order to understand the machining state according to a simulation based on a machining program in advance, so that malfunction does not occur in the machining of a work (workpiece to be machined) in the machine tool. In the case of finding that a malfunction will occur in the machining state according to the simulation by way of the simulation device, various machining conditions are adjusted. For example, a simulation device has been proposed that calculates shape error data by comparing between a target machined shape and an estimated machined shape, and suggests modifications of parameters which influence the machined shape of the work based on the shape error data (for example, refer to Patent Document 1).

Patent Document 1: Japanese Unexamined Patent Application, Publication No. 2001-125613

SUMMARY OF THE INVENTION

However, the invention disclosed in Patent Document 1 only modifies various parameters so that the shape error (path error) reaches a minimum, with the shape error (path error) as the evaluation index. On the other hand, at an actual manufacturing site, importance is given to not only simply the machining precision being high, but also the machining time, shock during operation, etc. In the present situation, a device is demanded that evaluates according to a plurality of evaluation indices, and is capable of modifying various parameters based on evaluation results.

The present invention has an object of providing a numerical control device that evaluates according to a plurality of evaluation indices, and is capable of modifying various parameters based on evaluation results.

A first aspect of the present invention relates to a numerical control device (e.g., the numerical control device 10 described later) that controls a machine tool (e.g., the machine tool 2 described later) having a drive mechanism (e.g., the drive mechanism 6 described later) causing a tool (e.g., the tool 5 described later) to move in a plurality of axial directions, the numerical control device including: a command position calculation unit (e.g., the interpolation processing simulation section 111 described later) that calculates command position information based on a machining program; a command path calculation unit (e.g., the command path calculation section 112 described later) that calculates command path information, based on the command position information calculated by the command position calculation unit; an estimated actual position calculation unit (e.g., the transmission characteristic simulation section 121 described later) that calculates estimated actual position information, based on the command position information and transmission characteristic information of the drive mechanism; an estimated actual path calculation unit (e.g., the estimation actual path calculation section 122 described later) that calculates estimated actual path information based on the estimated actual position information calculated by the estimated actual position calculation unit; a path error calculation unit (e.g., the path error calculation section 131 described later) that calculates path error, based on the command path information calculated by the command path calculation unit and the estimated actual path information calculated by the estimated actual path calculation unit; a machining time calculation unit (e.g., the machining time calculation section 132 described later) that calculates a machining time based on the estimated actual path information; a jerk calculation unit (e.g., the jerk calculation section 133 described later) that calculates jerk in each axis based on the estimated actual position information; and an evaluation value calculation unit (e.g., the evaluation value calculation section 140 described later) that calculates an evaluation value, based on the path error calculated by the path error calculation unit, the machining time calculated by the machining time calculation unit, and the jerk calculated by the jerk calculation unit.

According to a second aspect of the present invention, in the numerical control device described in the first aspect, the evaluation value calculation section may calculate each of a predetermined primary evaluation values Va, Vb and Vc, based on each of the path error, the machining time and the jerk, as well as calculating the evaluation value V produced by combining according to the following formula (Eq. 1).

$$V = Ka \cdot Va + Kb \cdot Vb + Kc \cdot Vc; \quad \text{(Formula 1)}$$

in which Va is a primary evaluation value corresponding to path error,
Vb is a primary evaluation value corresponding to machining time,
Vc is a primary evaluation value corresponding to jerk, and
Ka, Kb and Kc are modifiable factors.

According to a third aspect of the present invention, in the numerical control device as described in the second aspect, the path error calculation unit may calculate the path error a plurality of times, and output a maximum value among a plurality of the path errors thus calculated as path error, and the evaluation value calculation unit may calculate a primary evaluation value Va based on the maximum value of the path error.

According to a fourth aspect of the present invention, in the numerical control device as described in any one of the first to third aspects, the jerk calculation unit may calculate the jerk in each axis, and output a maximum value of absolute value thereof as jerk, and the evaluation value calculation unit may calculate a primary evaluation value Vc based on the maximum value of absolute value of the jerk in each axis.

According to a fifth aspect of the present invention, the numerical control device as described in any one of the first to fourth aspects may further include a parameter correction instruction unit (e.g., the parameter correction instruction section 150 described later) that instructs correction of various parameters including the transmission characteristic information.

According to the present invention, it is possible to provide a numerical control device that evaluates according to a plurality of evaluation indices, and is capable of modifying various parameters based on evaluation results.

DETAILED DESCRIPTION OF THE INVENTION

Figure 1:
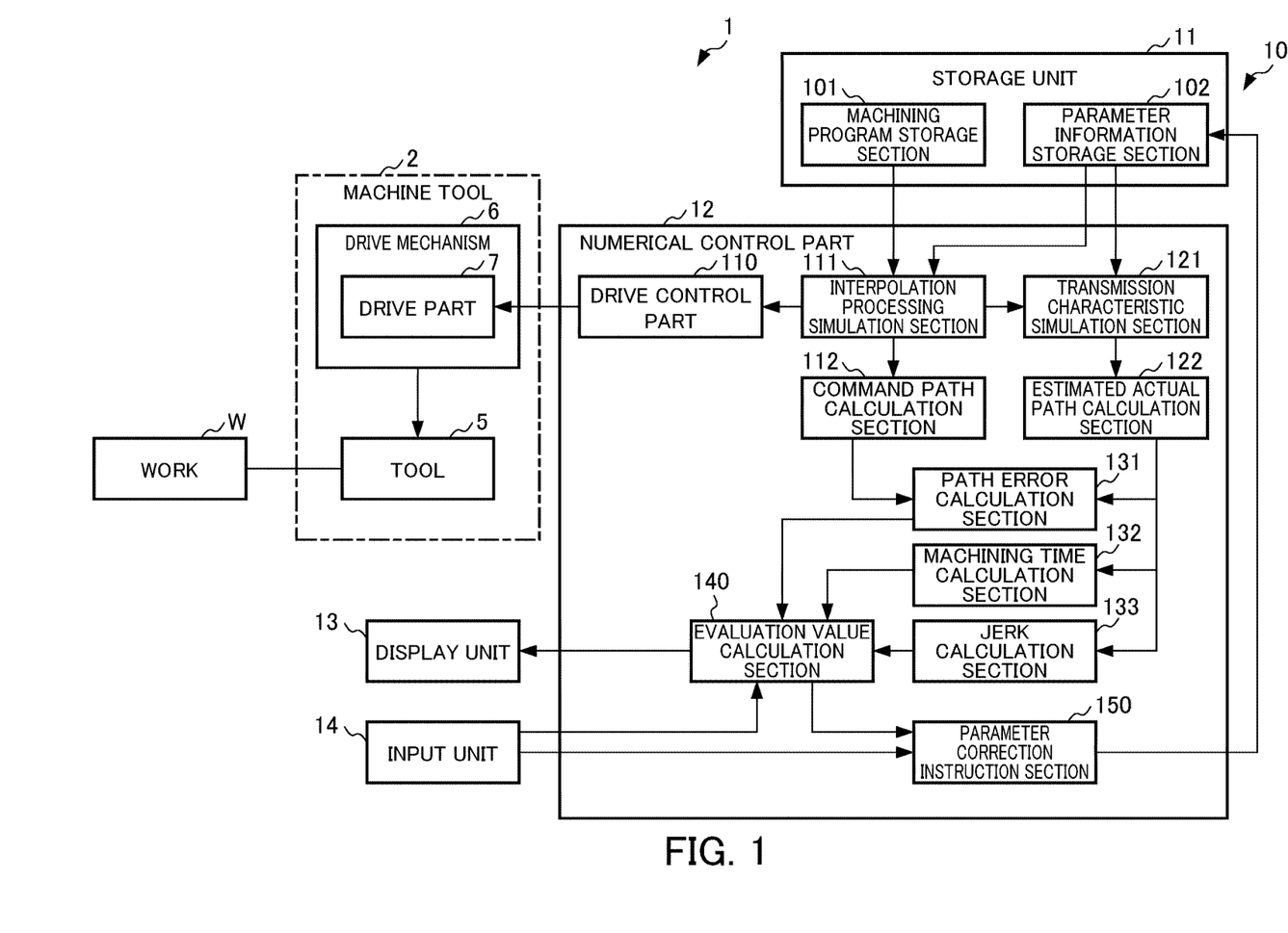
FIG. 1 is a block diagram illustrating the configuration of a numerical control device according to an embodiment of the present invention.
Figure 2:
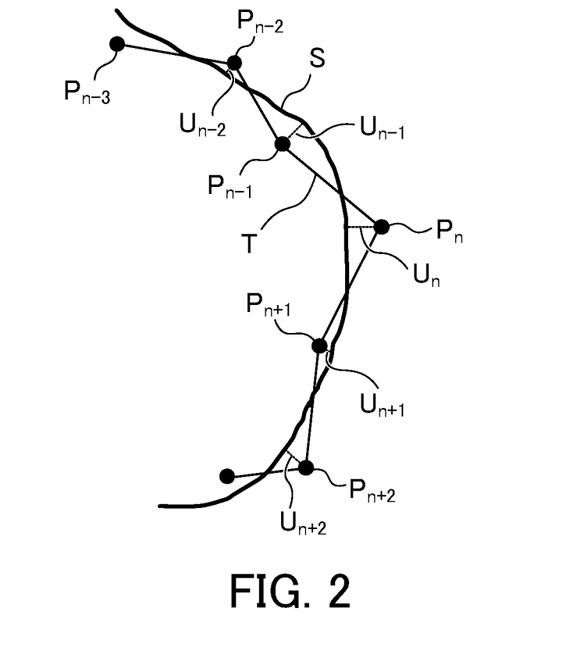
FIG. 2 is a schematic diagram illustrating a path error.
Figure 3:
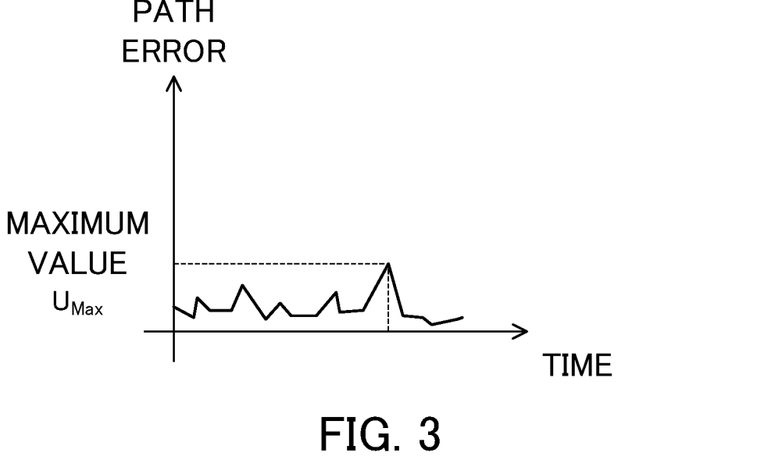
FIG. 3 is a graph illustrating a maximum value calculated as the path error by a path error calculation unit.
Figure 4:
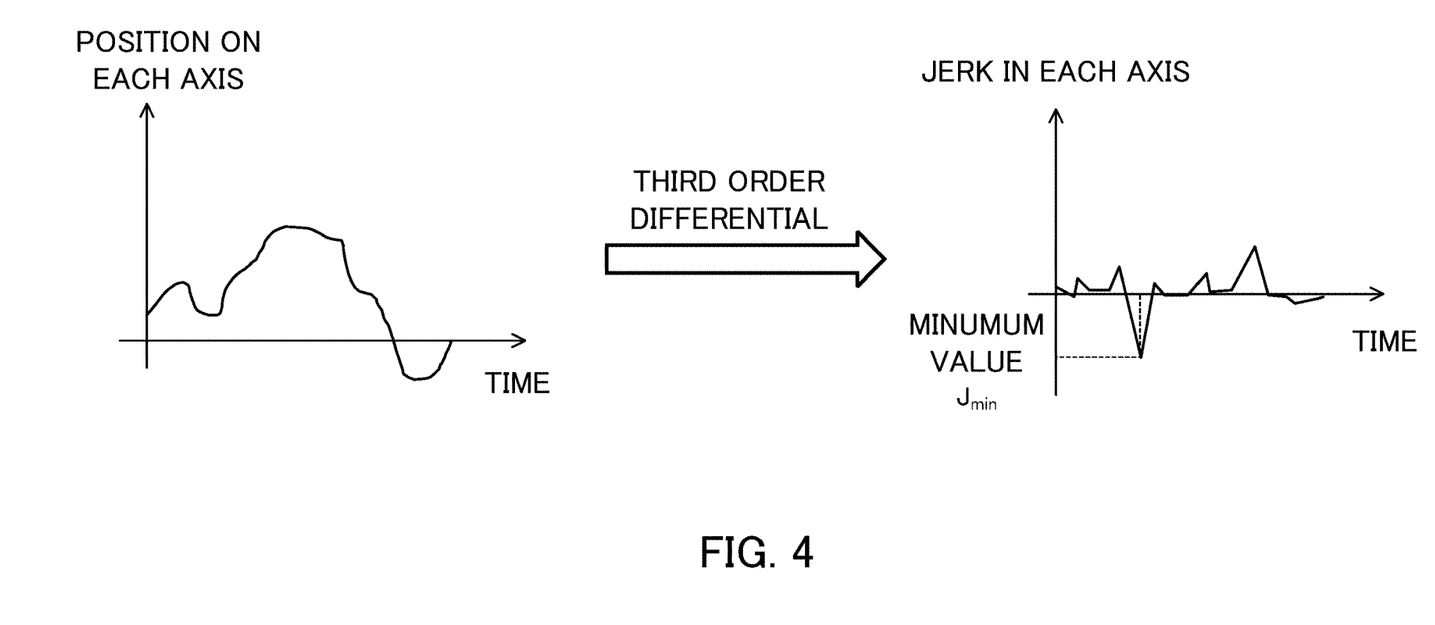
FIG. 4 is a graph illustrating a calculation sequence for jerk, and the maximum value of an absolute value calculated as a jerk by way of a jerk calculation unit.

Hereinafter, an embodiment of the present invention will be explained while referencing the drawings. A numerical control device 10 of an embodiment will be explained according to FIGS. 1 to 4. FIG. 1 is a block diagram illustrating the configuration of the numerical control device according to the embodiment of the present invention. FIG. 2 is a schematic diagram illustrating path error. FIG. 3 is a graph illustrating the maximum value calculated as the path error by way of a path error calculation unit. FIG. 4 is a graph illustrating the calculation sequence of jerk, and the maximum value of an absolute value calculated as the jerk by way of a jerk calculation unit.

As shown in FIG. 1, a work system 1 includes a machine tool 2, and the numerical control device 10 of the present embodiment. The machine tool 2 is a device that machines a work W (workpiece to be machined). The machine tool 2 is configured to be drivable in a plurality of axes such as X, Y, Z axes and the rotation axis. The numerical control device 10 is a device integrally connected to the machine tool 2, and controls the machine tool 2. In addition, in the present embodiment, the numerical control device 10 has a simulation function. It is also possible to understand as a part of the numerical control device 10 functioning also as a simulation device. Hereinafter, the machine tool 2 and numerical control device 10 will be explained in detail.

The machine tool 2 includes a tool 5 for machining the work W, and a drive mechanism 6 which causes the tool 5 to move in a plurality of axis directions. The tool 5 is a cutting tool, drill, etc. for example. The representative point which is the target at which each path described later is calculated is the leading end of the tool, for example.

The drive mechanism 6 causes the tool 5 to move on a plurality of axis directions. The drive mechanism 6 has an arm (not illustrated), and a drive part 7. The drive part 7 is a servomotor, etc. for example. The drive part 7 is controlled by a drive control unit 110 (described later) of the numerical control device 10, based on a machining program.

The numerical control device 10 includes a storage unit 11, numerical control unit 12, display unit 13, and input unit 14. The numerical control device 10 numerically controls the drive mechanism 6, as well as having a simulation function.

The storage unit 11 has a machining program storage section 101, and a parameter information storage section 102. The machining program storage section 101 stores machining programs for driving the drive mechanism 6 (drive part 7) in order to machine the work W into a predetermined shape.

The parameter information storage section 102, for example, stores acceleration/deceleration parameters applied in interpolation processing, and parameters related to transmission characteristics (drive-system characteristics) from the drive part 7 until the leading end of the tool 5. As parameters related to transmission characteristics, for example, servo parameters such as the position loop gain information, and feed-forward gain information can be exemplified. Various parameter information stored in the parameter information storage section 102 is modifiable by way of a correction instruction from a parameter correction instruction section 150 described later.

The numerical control unit 12 has a drive control section 110, interpolation processing simulation section 111 as a command position calculation part, command path calculation section 112, transmission characteristic simulation section 121 as an estimated actual position calculation part, estimated actual path calculation section 122, path error calculation section 131, machining time calculation section 132, jerk calculation section 133, evaluation value calculation section 140, and parameter correction instruction section 150.

The drive control section 110 controls the drive part 7 of the drive mechanism 6. The drive control section 110 controls the drive part 7 based on the machining programs stored in the machining program storage section 101. In more detail, the drive control section 110 controls the drive part 7 based on the command position information calculated by the interpolation processing simulation section 111 described later.

The interpolation processing simulation section 111 calculates the command position information based on the machining program stored in the machining program storage section 101. The interpolation processing simulation section 101 calculates predetermined position information from the machining program, as well as calculating command position information by performing interpolation processing using the acceleration/deceleration parameters, etc. stored in the parameter information storage section 102. The interpolation processing simulation section 111 calculates the command position information for every respective axis.

The command path calculation section 112 calculates the command path information based on the command position information calculated by the interpolation processing simulation section 111. The command path calculation section 112 calculates the command path information based on the command position information calculated for every respective axis. The command path is representative points of the tool 5 (for example, leading end), and is a path such as the command path S shown in FIG. 2, for example. The command path is displayed on the display unit 13 described later, for example.

The transmission characteristic simulation section 121 calculates the estimated actual position information based on the command position information calculated by the interpolation processing simulation section 111, and the transmission characteristic information of the drive mechanism 6 (drive part 7). The transmission characteristic information is information of the transmission characteristic from the drive part 7 until the leading end of the tool 5, for example. The transmission characteristic simulation section 121 estimates the actual position of the representative point on the tool 5 based on the command position information and transmission characteristic information, and calculates the estimated actual position information. The transmission characteristic simulation section 121 calculates the estimated actual position information for every respective axis.

The estimated actual path calculation section 122 calculates the estimated actual path information based on the estimated actual position information calculated by the transmission characteristic simulation section 121. The estimated actual path calculation section 122 calculates the estimated actual path information based on the estimated actual position information calculated for every respective axis. The estimated actual path is representative points of the tool 5 (for example, leading end), and is a path such as that of estimated actual path T shown in FIG. 2, for example. The estimated actual path is displayed on the display unit 13 described later.

The path error calculation section 131 calculates the path error based on the command path information calculated by the command path calculation section 112, and the estimated actual path information calculated by the estimated actual path calculation section 122. More specifically, the path error calculation section 131 calculates the path error multiple times, as well as outputting the maximum value among the plurality of path errors thus calculated as the path error.

In detail, first, the path error calculation section 131 calculates the distance from a plurality of sample points Pn on the estimated actual path T until the command path as path errors Un (candidates), as shown in FIG. 2. The path error is preferably the shortest distance from the sample point Pn to the designated path; however, it is possible to calculate by way of a known calculation method. For example, the position Sn (not illustrated) is set for the command path at every predetermined time, adjacent positions (for example, position Sn and position Sn+1) are connected by a line segment, a vertical line is drawn from each of the plurality of sample points Pn to each of the plurality of line segments, and the length of this vertical line is calculated, whereby it is possible to calculate the path error (candidate).

In the present embodiment, the path error calculation section 131 sets the maximum value among the calculated path errors Un (candidates) as the path error. The path error calculation section 131 sets the maximum value Umax in FIG. 3 as the path error, for example. Then, the path error calculation section 131 establishes the maximum value Umax among the path errors Un (candidates) as information of the path error, and outputs to the evaluation value calculation section 140.

The machining time calculation section 132 calculates the machining time based on the estimated actual path information. The machining time is the time required in order for machining to complete. The machining time calculation section 132 outputs the information of the machining time calculated to the evaluation value calculation section 140.

The jerk calculation section 133 calculates the jerk on each axis, and outputs the maximum value of the absolute value thereof as the jerk. In detail, first, the jerk calculation section 133 calculates the jerk for every respective axis, based on the estimated actual position information. As shown in FIG. 4, the jerk calculation section 133 calculates the jerk for every respective axis, by taking the third order differential of the position information for every respective axis included in the estimated actual position information. The jerk calculation section 133 sets the maximum value of the absolute value of the calculated jerk as the jerk. The jerk calculation section 133 sets the minimum value Jmin which is the maximum value of an absolute value as the jerk, as shown in FIG. 4, for example. Then, the jerk calculation section 133 sets the minimum value Jmin which is the maximum value of the absolute value as the information of jerk, and outputs to the evaluation value calculation section 140. The jerk calculation section 133 outputs the maximum value of the absolute value of the jerk for every respective axis to the evaluation value calculation section 140.

The evaluation value calculation section 140 calculates an evaluation value V based on the path error calculated by the path error calculation section 131, machining time calculated by the machining time calculation section 132, and jerk calculated by the jerk calculation section 133. More specifically, the evaluation value calculation section 140 calculates each of the predetermined primary evaluation values Va, Vb, Vc based on the path error, machining time and jerk, respectively. The evaluation value calculation section 140 calculates each of the primary evaluation values Va, Vb, Vc based on predetermined calculation formulas, evaluation value tables, etc., for example.

For example, the evaluation value calculation section 140 calculates the primary evaluation value Va according to the magnitude of the path error. The evaluation value calculation section 140 calculates the primary evaluation value Va according to the magnitude of the maximum value among path errors (candidates) calculated by the path error calculation section 131. In addition, for example, the evaluation value calculation section 140 calculates the primary evaluation value Vb according to the length of the machining time. Moreover, for example, the evaluation value calculation section 140 calculates the primary evaluation value Vc according to the jerk in a predetermined axis and the jerk of all axes. The evaluation value calculation section 140 calculates the primary evaluation value Vc according to the maximum value of the absolution value among jerks.

Then, the evaluation value calculation section 140 calculates the evaluation value V produced by combining according to the following formula (Eq. 1).

$$V = K_a \cdot V_a + K_b \cdot V_b + K_c \cdot V_c$$

Va=primary evaluation value corresponding to path error
Vb=primary evaluation value corresponding to machining time
Vc=primary evaluation value corresponding to jerk
Ka, Kb, Kc: modifiable factors The evaluation value calculation section 140 performs a comprehensive or multifaceted evaluation based on the path error, machining time and jerk, for the machining state and machining operation according to a predetermined machining program. The evaluation value V calculated by the evaluation value calculation section 140 is numerical information reflecting the evaluation considering the machining error (path error), machining time and the operational shock (jerk) of the drive mechanism 6. A greater numerical value for the evaluation value V indicates the evaluation being high. By modifying various parameters based on the evaluation value V calculated by the evaluation value calculation section 140, it is possible to correct to the optimum machining operation as a whole, while further improving the evaluation index given high importance.

In the present embodiment, the evaluation value V calculated by the evaluation value calculation section 140 is displayed on the display unit 13. The user confirms the evaluation value V displayed on the display unit 13, as well as being able to make a correction instruction for the various parameters, via the input unit 14, so as to improve any among the path error, machining time and jerk, for example.

In addition, in the present embodiment, the evaluation value calculation section 140 is configured to be able to output the calculated evaluation value V (and each primary evaluation value) to the parameter correction instruction section 150 (described later). For example, in the case of the parameter correction index section 150 (described later) being set so as to automatically correct various parameters so that the evaluation value V becomes at least a predetermined value, the various parameters are automatically adjusted based on the evaluation value V outputted from the evaluation value calculation section 140.

The aforementioned factors Ka, Kb, Kc are modifiable factors. By modifying the numeric values of Ka, Kb, Kc, it is possible to modify the weighting of the primary evaluation values Va, Vb, Vc. By modifying the factors Ka, Kb, Kc, it is possible to change the point given importance upon evaluation. For example, the factor Ka is modified in the case of giving importance to the machining precision, the factor Kb is modified in the case of giving importance to the machining speed, and the factor Kc is modified in the case of giving importance to stability of the machining operation and damage prevention to the tool. The user can also increase the factor corresponding to the evaluation index given importance, or conversely decrease the factor corresponding to the evaluation index not given importance, via the input unit 14. By modifying the factors Ka, Kb, Kc, it is possible to realize a machining operation of conditions desired by the user and/or manufacturing site.

The parameter correction instruction section 150 is configured to enable instructing the correction of various parameters stored in the parameter information storage section 102, including the transmission characteristic information. More specifically, the parameter correction instruction section 150 is configured to enable instructing correction of the acceleration/deceleration parameters used in interpolation processing, the servo parameters which are parameters related to the transmission characteristics, etc.

The parameter correction instruction section 150 instructs correction of various parameters, based on the correction instruction from the input unit 14 by the user, as mentioned previously. In addition, the parameter correction instruction section 150, for example, may have an automatic correction function of automatically correcting various parameters so that the evaluation value V becomes at least a predetermined value (so that the evaluation increases). In the case of the automatic correction function being the ON state, the parameter correction instruction section 150 automatically instructs correction of a predetermined parameter based on the evaluation value V outputted from the evaluation value calculation section 140. Then, a correction unit (not illustrated) is configured so as to correct a predetermined parameter based on the correction instruction outputted from the parameter correction instruction section 150. It should be noted that the parameter correction instruction section 150 may be configured so as to directly correct various parameters.

The display unit 13 is configured to be able to display the command path S, estimated actual path T, etc., in addition to the aforementioned evaluation value V. The input unit 14 is configured to enable inputting of modification instructions for the factors Ka, Kb, Kc to the evaluation value calculation section 140, in addition to the aforementioned parameter correction instruction.

Figure 5:
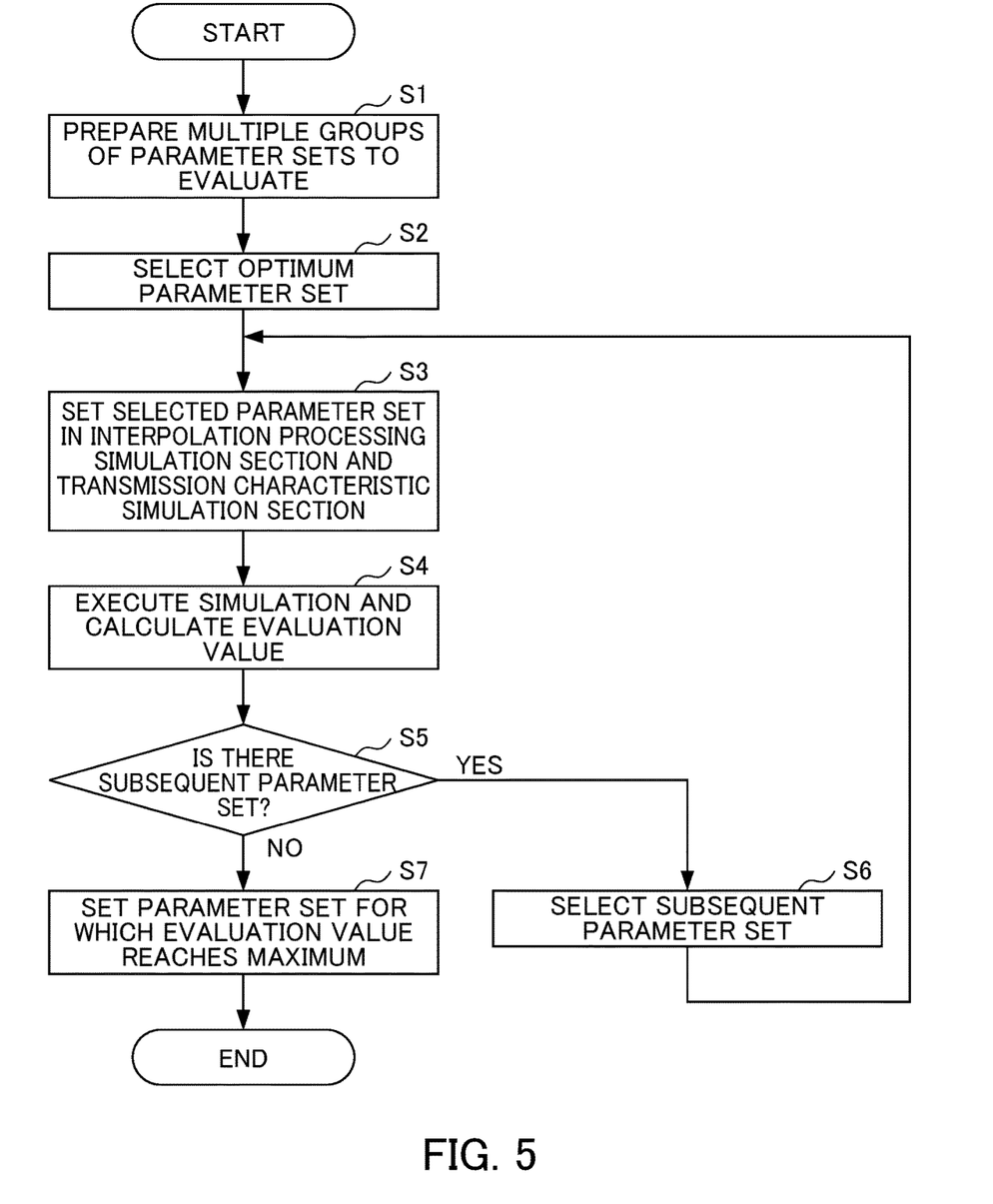
FIG. 5 is a flowchart showing the processing of setting the parameter set for which the evaluation value becomes a maximum.
Figure 6:
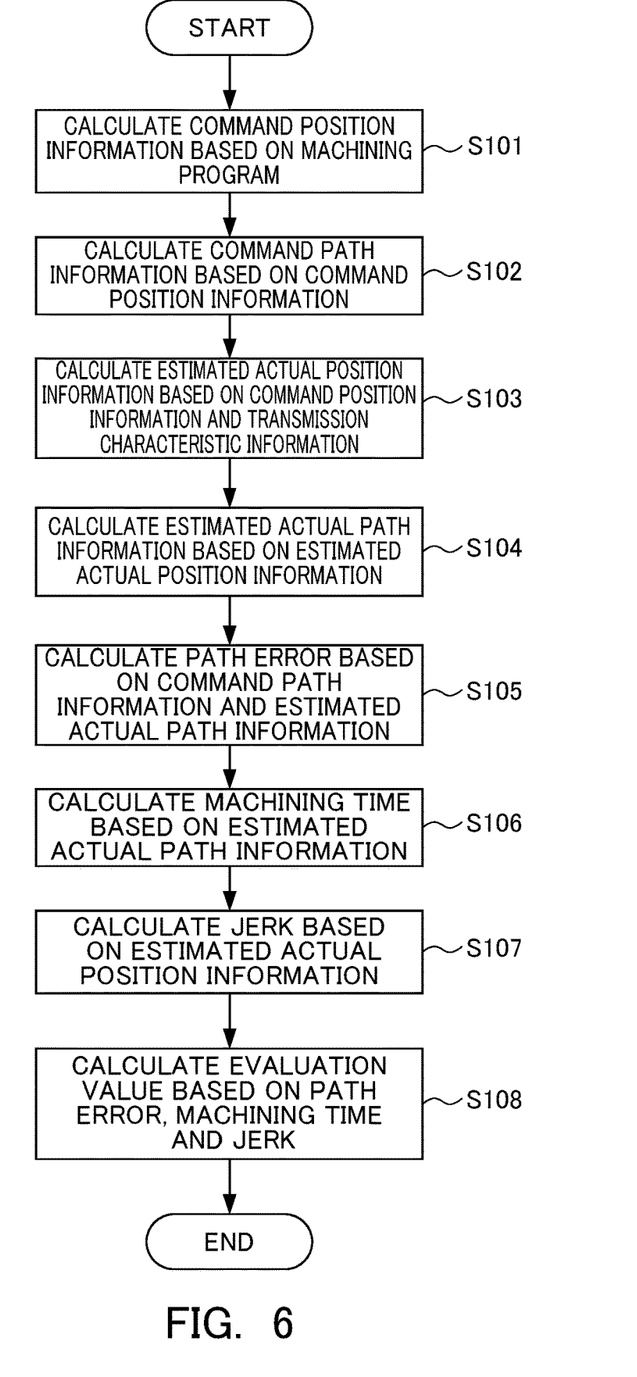
FIG. 6 is a flowchart specifically further showing Step S4 in FIG. 5.

Next, a setting sequence of a parameter set by way of the numerical control device of the embodiment will be explained. FIG. 5 is a flowchart showing the processing of setting the parameter set for which the evaluation value reaches a maximum. FIG. 6 is a flowchart specifically further showing Step S4 in FIG. 5. The parameters are as mentioned above.

As shown in FIG. 5, the numerical control unit 12 prepares multiple groups of parameter sets to be evaluated in Step S1. Next, in Step S2, the numerical control unit 12 selects the initial parameter set.

Next, in Step S3, the numerical control unit 12 sets the selected parameter set in the interpolation processing simulation section 111 and transmission characteristic simulation section 121. Next, in Step S4, the numerical control unit 12 calculates the evaluation value by executing simulation.

The details of the processing in Step S4 will be specifically explained using FIG. 6. As shown in FIG. 6, the interpolation processing simulation section 111 calculates the command position information based on the machining program in Step S101.

Next, in Step S102, the command path calculation section 112 calculates the command path information, based on the command position information calculated by the interpolation processing simulation section 111.

Next, in Step S103, the transmission characteristic simulation section 121 calculates the estimated actual position information, based on the command position information, and the transmission characteristic information of the drive mechanism 6.

Next, in Step S104, the estimated actual path calculation section 122 calculates the estimated actual path information, based on the estimated actual position information calculated by the transmission characteristic simulation section 121.

Next, in Step S105, the path error calculation section 131 calculates the path error, based on the command path information calculated by the command path calculation section 112, and the estimated actual path information calculated by the estimated actual path calculation section 122.

Next, in Step S106, the machining time calculation section 132 calculates the machining time based on the estimated actual path information.

Next, in Step S107, the jerk calculation section 133 calculates the jerk in each axis, based on the estimated actual position information.

Next, in Step S107, the evaluation value calculation section 140 calculates the evaluation value based on the path error calculated by the path error calculation section 131, the machining time calculated by the machining time calculation section 132, and jerk calculated by the jerk calculation section 133.

It should be noted that, in regards to the respective steps shown in FIG. 6, for multiple steps for which the order thereof is not important, the order thereof can be switched. For example, Steps S105, S106 and S107 can be switched in order, or may be simultaneous.

Returning back to FIG. 5, the flowchart shown in FIG. 5 will be explained again. As shown in FIG. 5, the numerical control unit 12 confirms the existence of a subsequent parameter set in Step S5. In the case of there being a subsequent parameter set (YES), the numerical control unit 12 advances the processing to Step S6.

In Step S6, the numerical control unit 12 selects the subsequent parameter set, and thereafter, returns the processing to Step S3.

In Step S5, in the case of there not being a subsequent parameter set (NO), the numerical control unit 12 advances the processing to Step S7.

In Step S7, the numerical control unit 12 sets the parameter set for which the evaluation value reaches a maximum. The numerical control device 10 of the present embodiment can set the parameter set for which the evaluation value reaches a maximum, according to such a flow.

The following effects are exerted according to the present embodiment, for example. The numerical control device 10 of the present embodiment includes: the command position calculation section 111 that calculates the command position information based on the machining program; the command path calculation section 112 that calculates the command path information based on the command position information calculated by the command position calculation section 111; the estimated actual position calculation section 121 that calculates the estimated actual position information based on the command position information and the transmission characteristic information of the drive mechanism 6; the estimated actual path calculation section 122 that calculates the estimated actual path information based on the estimated actual position information calculated by the estimated actual position calculation section 121; the path error calculation section 131 that calculates the path error based on the command path information calculated by the command path calculation section 112, and the estimated actual path information calculated by the estimated actual path calculation section 122; the machining time calculation section 132 that calculates the machining time based on the estimated actual path information; the jerk calculation section 133 that calculates the jerk in each axis based on the estimated actual position information; and the evaluation value calculation section 140 that calculates the evaluation value based on the path error calculated by the path error calculation section 131, machining time calculated by the machining time calculation section 132, and jerk calculated by the jerk calculation section 133.

For this reason, according to the present embodiment, it is possible to provide a numerical control device that evaluates according to a plurality of evaluation indices, as well as being able to modify various parameters based on evaluation results.

More specifically, the relationship between machining time and path error is generally in the relationship of a trade off. Similarly, the relationship between the machining time and jerk is also in a relationship of a trade off. If shortening the machining time, the path error increases, and the jerk in each axis (shock during operation) also increases. In the machining performed by the machine tool, the performance demanded will vary depending on the type of workpiece to be machined (work), and there are cases of high precision being demanded even if the machining time lengthens, and cases of adjusting parameters by giving more importance on the machining time than precision in consideration of productivity. However, in either case, there are few cases where deciding parameters by making only one evaluation index as the scale and disregarding the others, and better parameters are applied by considering a balance of each. In the present embodiment, it is possible to more simply decide parameters for good balance, due to calculating one evaluation value by combining a plurality of evaluation indices.

In addition, according to the present embodiment, the evaluation value calculation section 140 performs comprehensive or multifaceted evaluation based on the path error, machining time and jerk, for machining state and machining operations according to a predetermined machining program. The evaluation value V calculated by the evaluation value calculation section 140 is numerical information reflecting evaluation done by considering the machining error (path error), machining time, and operational shock (jerk) of the drive mechanism 6. By modifying the various parameters based on the evaluation value V calculated by the evaluation value calculation section 140, it is possible to correct to an optimum machining operation as a whole, while further improving the evaluation index given importance.

In addition, with the present embodiment, the evaluation value calculation section 140 calculates each of predetermined primary evaluation values Va, Vb and Vc, based on each of the path error, the machining time and the jerk, as well as calculating the evaluation value V produced by combining according to the above-mentioned formula (Eq. 1).

According to the present embodiment, it is possible to modify the weighting of primary evaluation values Va, Vb and Vc by changing the numerical values of Ka, Kb and Kc. It is possible to change the point given importance upon evaluation by modifying the factors Ka, Kb and Kc. By modifying the factors Ka, Kb, Kc, it is possible to realize a machining operation of conditions desired by the user and/or manufacturing site. In addition, by modifying the factors, it is possible to flexibly handle cases for which the required evaluation indices differ.

Furthermore, with the present embodiment, the numerical control device 10 further includes the parameter correction instruction section 150 that instructs correction of various parameters including the transmission characteristic information.

According to the present embodiment, the numerical control device is configured to enable correction of various parameters, by the user confirming the evaluation value V, and inputting a correction instruction for improving any among the path error, machining time and jerk to the input unit 14, for example. In addition, for example, the numerical control device is configured to be able to set the parameter correction instruction section 150 so as to correct various parameters so that the evaluation value V automatically becomes at least a predetermined value.

Although an embodiment of the present invention has been explained in the aforementioned, the present invention is not to be limited thereto. Modification and improvements within a scope that can achieve the objects of the present invention are also encompassed by the present invention.

EXPLANATION OF REFERENCE NUMERALS 1 work system
2 machine tool
6 drive mechanism
7 drive part
10 numerical control device
11 storage unit
12 numerical control unit
13 display unit
14 input unit
101 machining program storage section
102 parameter information storage section
110 drive control section
111 interpolation processing simulation section (command position calculation unit)
112 command path calculation section
121 transmission characteristic simulation section (estimated actual position calculation unit)
122 estimated actual path calculation section
131 path error calculation section
132 machining time calculation section 133 jerk calculation section
140 evaluation value calculation section
150 parameter correction instruction section

What is claimed is:

1. A numerical control device that controls a machine tool having a drive mechanism causing a tool to move in a plurality of axial directions, the numerical control device comprising:
    a command position calculation unit that calculates command position information based on a machining program;
    a command path calculation unit that calculates command path information, based on the command position information calculated by the command position calculation unit;
    an estimated actual position calculation unit that calculates estimated actual position information, based on the command position information and transmission characteristic information of the drive mechanism;
    an estimated actual path calculation unit that calculates estimated actual path information based on the estimated actual position information calculated by the estimated actual position calculation unit;
    a path error calculation unit that calculates path error, based on the command path information calculated by the command path calculation unit and the estimated actual path information calculated by the estimated actual path calculation unit;
    a machining time calculation unit that calculates a machining time based on the estimated actual path information;
    a jerk calculation unit that calculates jerk in each axis based on the estimated actual position information;
    an evaluation value calculation unit that calculates an evaluation value, based on the path error calculated by the path error calculation unit, the machining time calculated by the machining time calculation unit, and the jerk calculated by the jerk calculation unit; and
    a parameter correction instruction unit that instructs correction of various parameters including the transmission characteristic information based on the evaluation value.

2. The numerical control device according to claim 1,
wherein the evaluation value calculation section calculates each of a predetermined primary evaluation values Va, Vb and Vc, based on each of the path error, the machining time and the jerk,
and calculates an evaluation value V made by combining according to Formula 1 below:

$$V = Ka \cdot Va + Kb \cdot Vb + Kc \cdot Vc; \quad \text{(Formula 1)}$$

wherein Va is a primary evaluation value corresponding to path error,
wherein Vb is a primary evaluation value corresponding to machining time,
wherein Vc is a primary evaluation value corresponding to jerk, and
wherein Ka, Kb and Kc are modifiable factors.

3. The numerical control device according to claim 2,
wherein the path error calculation unit calculates the path error a plurality of times, and outputs a maximum value among a plurality of the path errors thus calculated as path error, and
wherein the evaluation value calculation unit calculates a primary evaluation value Va based on the maximum value of the path error.

4. The numerical control device according to claim 1,
wherein the jerk calculation unit calculates the jerk in each axis, and outputs a maximum value of absolute value thereof as jerk, and
wherein the evaluation value calculation unit calculates a primary evaluation value Vc based on a maximum value of absolute value of the jerk in each axis.

* * * * *